Jan. 7, 1958 J. J. HALTMAR, JR 2,819,095
SAFETY SEAT AND SEAT BELT CONSTRUCTION FOR MOTOR VEHICLES
Filed May 11, 1956 2 Sheets-Sheet 1
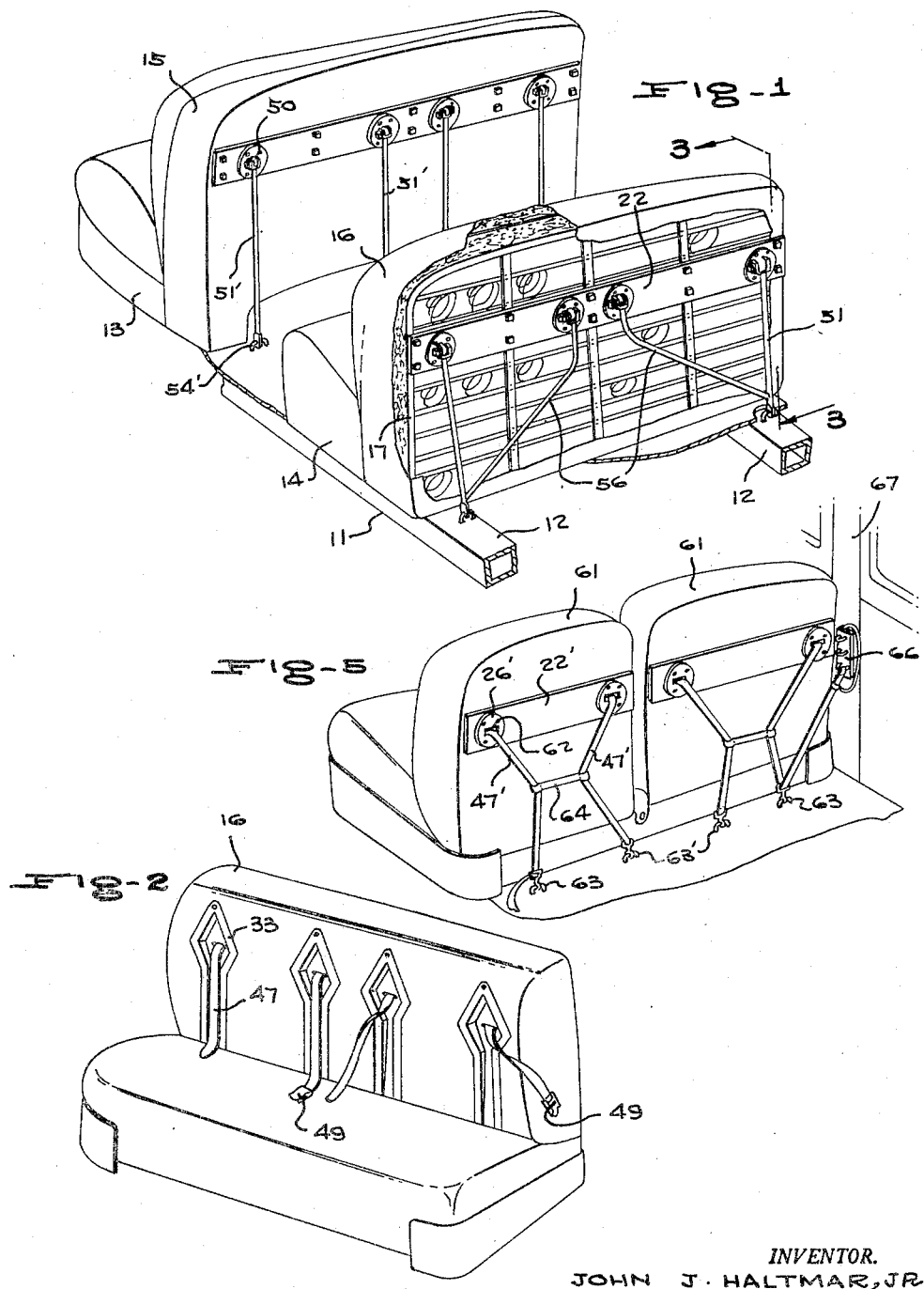
INVENTOR.
JOHN J. HALTMAR, JR.
BY
McMorrow, Berman & Davidson
ATTORNEYS Jan. 7, 1958   J. J. HALTMAR, JR   2,819,095
SAFETY SEAT AND SEAT BELT CONSTRUCTION FOR MOTOR VEHICLES
Filed May 11, 1956   2 Sheets-Sheet 2
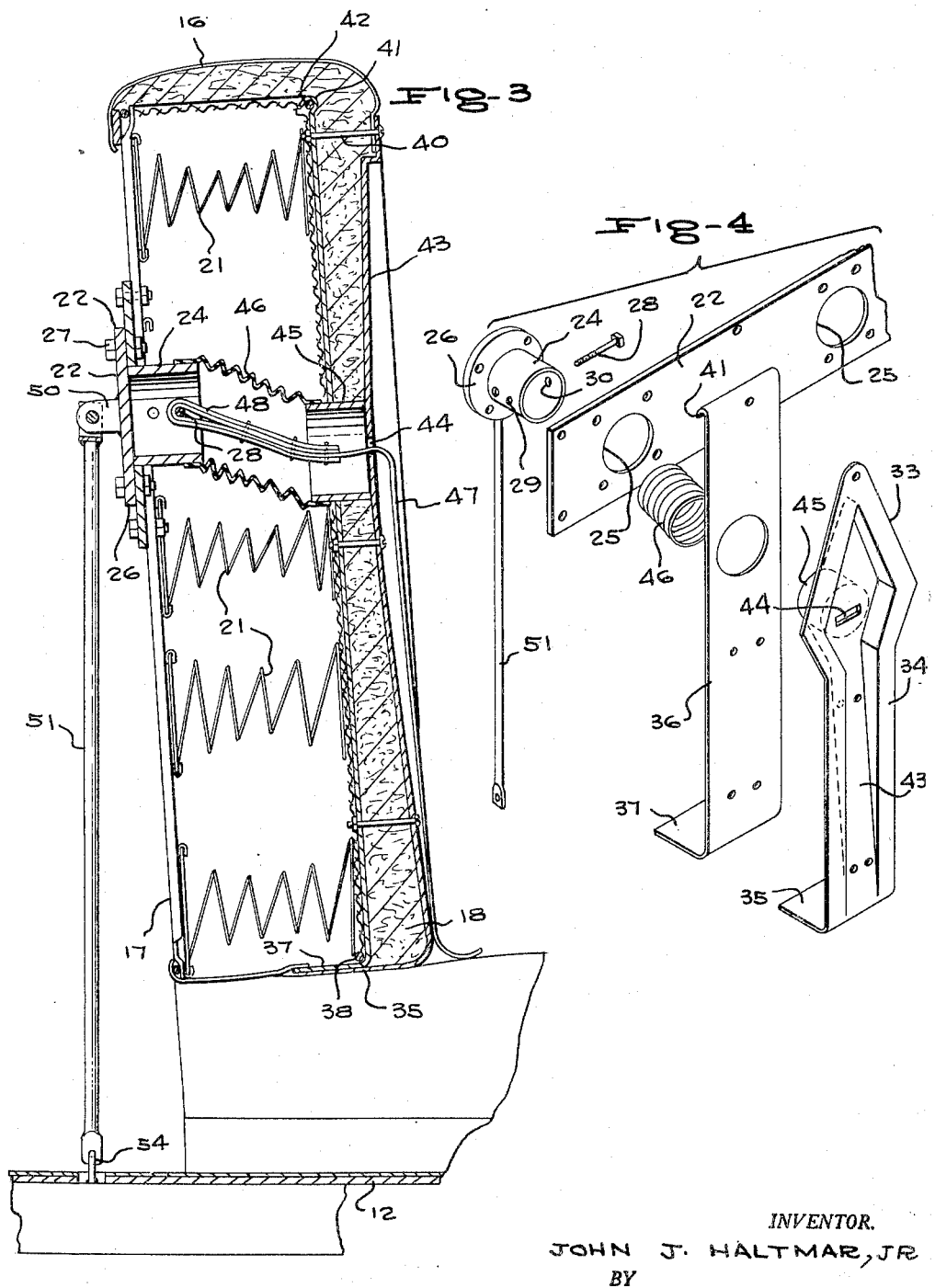
INVENTOR.
JOHN J. HALTMAR, JR
BY
McMorrow, Berman & Davidson
ATTORNEYS

United States Patent Office 2,819,095
Patented Jan. 7, 1958

2,819,095

SAFETY SEAT AND SEAT BELT CONSTRUCTION FOR MOTOR VEHICLES

John Joe Haltmar, Jr., Ennis, Tex.

Application May 11, 1956, Serial No. 584,329

2 Claims. (Cl. 280—150)

This invention relates to vehicle bodies, and more particularly to safety seat construction for motor vehicles embodying the provision of safety belts in the motor vehicle seats.

A main object of the invention is to provide a novel and improved motor vehicle safety seat assembly which involves relatively simple components, which is easy to install, and which greatly increases the riding safety of a vehicle equipped therewith.

A further object of the invention is to provide an improved motor vehicle seat construction embodying the provision of safety belts, the improved construction requiring inexpensive components, being arranged so that it does not interfere with the riding comfort of the vehicle seats equipped with the safety structure of this invention, and being arranged so that the safety belt elements involved in the structure may be normally housed in an inconspicuous position but which may be readily made available for use by a passenger, if required.

Further objects and advantages of the invention will become apparent from the following description and claims, and from the accompanying drawings, wherein:

Figure 1 is a rear perspective view of a fragmentary portion of a motor vehicle chassis on which are mounted front and rear seats provided with improved safety devices according to the present invention.

Figure 2 is a front perspective view of one of the vehicle seats of Figure 1.

Figure 3 is an enlarged vertical cross sectional view taken on the line 3—3 of Figure 1.

Figure 4 is an enlarged perspective view showing the components of one unit of the belt connecting assemblies employed in Figure 1, the respective parts of the unit being shown in separated positions.

Figure 5 is a rear perspective view of a seat belt assembly according to this invention modified for use with divided seats.

Referring to the drawings, and particularly to Figures 1 to 4, 11 generally designates the chassis of a motor vehicle, said chassis including the longitudinal frame elements 12, 12. Designated respectively at 13 and 14 are front and rear seats, the seat 13 being provided with the cushioned back portion 15 and the seat 14 being provided with the cushioned back portion 16. Each of the cushioned back portions 15 and 16 are constructed in a conventional manner and are provided with substantially rigid rear frames and flexible front walls. Thus, the seat back 16 is provided with a rigid rear frame 17 and a flexible front wall 18 which is filled with suitable cushioning material such as foam rubber, or the like. The seat back 16 also is provided with the coiled springs 21 which are interposed between and which are connected to the flexible front wall 18 and the rigid rear frame 17.

Secured to the rear frame 17 is a transverse, horizontally extending plate 22 which is located at the upper portion of rear frame 17. Secured in the plate 22 are respective spaced pairs of cylindrical collar elements 24, the plate 22 being formed with circular apertures 25 receiving the collar elements 24, and the collar elements having rigidly secured thereto circular disc members 26 which are bolted to the plate 22, as by the bolts 27. Engaged through the inner portion of each collar member 24 is a transversely extending anchor pin 28, which may be provided with threads and which may threadedly engage in a tapped opening 29 provided in the collar 24 opposite a receiving opening 30, as shown in Figure 4. The pin 28 is engaged through the receiving opening 30 and is threadedly engaged in the tapped opening 29.

Mounted in the front wall of each seat back opposite a collar element 24 is a vertically recessed face plate 33 having the marginal flange 34 and the horizontal bottom flange 35. As shown in Figures 3 and 4, a cooperating plate member 36 is provided adjacent the inside surface of the front wall of the seat back for each of the recessed face plates 33. The inside plate 36 is provided with the horizontal bottom flange 37 which extends beneath the bottom horizontal seat frame rod 38, as shown in Figure 3 and overlies the bottom flange 35 of the associated face plate 33. The top end of the face plate 33 is secured to the top portion of the associated inside plate 36 by a bolt 40. The top end of the inside plate is curved to define a hook-like channel 41 which is engaged over the top horizontal frame rod 42 of the seat back.

The main inner wall 43 of each face plate 33 is inclined inwardly from its top and bottom ends toward a horizontal slot 44 formed in the wall 43 at a height generally corresponding to the height of the opposing collar member 24, as shown in Figure 3. Rigidly secured to the inside surface of the wall 43 is a cylindrical collar element 45, and connecting the collar element 45 with the opposing collar 24 is a flexible tube 46 of rubber, or similar flexible material which is preferably annularly corrugated, as shown in Figures 3 and 4, resembling a bellows, whereby the tubular member 46 may readily change its length in response to flexure of the front wall 18 of the seat back.

Extending through each slot 44 is a safety belt member 47, the end of each belt member 47 being fastened to the collar element 24 associated therewith by the provision of a suitable anchoring loop 48 on the end of the belt element which is engaged around the transverse pin 28 associated with the collar element 24, in the manner illustrated in Figure 3. As will be readily apparent, when the belt element 27 is not in use, it is received in the lower portion of the vertical recess of the associated face plate 33, whereby it is substantially flush with the flexible wall 18 and is relatively inconspicuous.

As shown in Figure 2, one of each pair of belt elements may be provided with a suitable buckle 49 for receiving and lockingly engaging with the mating belt element, whereby the belt elements may be secured around the body of a person occupying the seat.

Rigidly secured on the transverse plate 22 adjacent each collar element 24 is an outwardly projecting apertured lug 50, and connected to the end of each apertured lug 50 at the outer end portions of the plate 22 are respective depending rigid tie rods 51 which are secured at their bottom ends to the longitudinal chassis frame members 12, as by anchoring loops 54 provided on the frame elements. The lugs 50 at the intermediate portions of the transverse plate 22 are likewise connected to the chassis frame members 12 by tie bars 56 which are rigidly connected at their lower ends to the lower portions of the tie bars 51, as is clearly shown in Figure 1, whereby all of the collar elements 24 associated with the rear seat back 16 are connected to the chassis frame members 12, 12, and whereby the belt elements 27 associated with said rear seat are likewise connected to the chassis through the collar elements 24. The collar elements 24 of the front seat back 15 are similarly connected to the vehicle chassis, each of the collar elements 24 of the front seat back having its lug 50 connected to the vehicle chassis by a depending straight tie rod 51' whose lower end is connected to a fastening loop 54' rigidly secured in any suitable manner to the vehicle chassis.

As will be readily apparent, when the seat belt elements 27 are engaged around the bodies of the passengers occupying the vehicle seats, tension on the seat belt elements is transmitted directly to the vehicle chassis through the collar elements 24 and their associated tie rods 51, 56 or 56'. Thus, the passengers are fastened by means of their belt elements 47 directly to the vehicle chassis and cannot be thrown forwardly in the case of a collision or other emergency situation, such as when the vehicle brakes are suddenly applied. At the same time, the flexible front walls of the seat backs provide a sufficient cushioning effect to allow the passengers to ride comfortably even when the seat belt elements are tightly fastened around the passengers' bodies.

Referring to the form of the invention illustrated in Figure 5, 61, 61 designate respective segments of a divided seat, such as is provided in vehicles of the two-door type. Each of the segments 61, 61 is provided with a pair of recessed front face plates 33, similar to those employed in the previously described forms of the invention, and rigidly secured to the rear frame of each of the seat backs of the seats 61, 61 is a transversely extending plate member 22' to which are secured the respective collar elements associated with the recessed face plates in the front wall of the seat back, each collar element having an anchoring disc 26' by means of which the collar element is fastened to the transverse plate 22' associated therewith. The disc members 26' are centrally slotted, each disc member having a horizontal slot 62, and the belt members, shown at 47' extend through the horizontal slots 62 and are fastened directly to upstanding rigid loops 63 secured to the vehicle chassis. The rear portions of each pair of belt members 47', 47' associated with each seat 61 are tied together by transversely extending flexible belt sections 64, as shown in Figure 5.

As shown in Figure 5, the inner belt sections 47' are fastened directly to loops 63' secured to the vehicle chassis at the intermediate portion of the vehicle floor, whereas the outer belts 47' extend through outer loops 63, also secured to the vehicle chassis, the outer belts being fastened at their ends to anchor plates 66 secured to the respective center posts 67 at the opposite sides of the vehicle body.

Obviously, the outer belt elements 47' in Figure 5 may be fastened either directly to the outer loops 63, or to the center post plates 66, as desired. In either case, the tension of the belts 47' is transmitted directly to the vehicle chassis, as in the previously described forms of the invention, providing the same advantages as above mentioned in connection with Figures 1 to 4.

While certain specific embodiments of improved safety seat structures for motor vehicles have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle, a chassis, a seat mounted on said chassis, said seat being provided with a cushioned back portion having a substantially rigid rear frame and a flexible front wall, a transverse horizontally extending plate secured to said rear frame, means defining a plurality of spaced tubular passages connecting said plate to said front wall, respective rigid, vertically extending vertically recessed face plates secured in said front wall and being formed with horizontal slots communicating with said passages, respective flexible safety straps extending into said passages through said horizontal slots, and means connecting said straps to said chassis behind said seat.

2. In a motor vehicle, a chassis, a seat mounted on said chassis, said seat being provided with a cushioned back portion having a substantially rigid rear frame and a flexible front wall, a transverse horizontally extending plate secured to said rear frame, means defining a plurality of spaced tubular passages connecting said plate to said front wall, respective depending tie rods secured to said transverse plate adjacent said tubular passages and being connected to said chassis behind the seat, respective rigid, vertically extending, vertically recessed face plates secured in said front wall and being formed with horizontal slots communicating with said passages, respective flexible safety straps extending into said passages through said horizontal slots, and means connecting said straps to the rear portions of said passage-defining means adjacent said transverse plate.

References Cited in the file of this patent
UNITED STATES PATENTS

| | | |
|---|---|---|
| 894,052 | Radtke | July 21, 1908 |
| 1,616,349 | Cagle | Feb. 1, 1927 |
| 2,263,348 | Barros | Nov. 18, 1941 |
| 2,280,694 | Embree | Apr. 21, 1942 |
| 2,557,313 | Quilter | June 19, 1951 |
| 2,634,802 | Stumm | Apr. 14, 1953 |